(12) United States Patent
Karstens

(10) Patent No.: US 7,367,496 B2
(45) Date of Patent: May 6, 2008

(54) DETECTING WEAR THROUGH USE OF INFORMATION-TRANSMITTING DEVICES

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 11/145,841

(22) Filed: Jun. 6, 2005

(65) Prior Publication Data

US 2006/0273148 A1    Dec. 7, 2006

(51) Int. Cl.
*G06K 19/06* (2006.01)

(52) U.S. Cl. ..................... 235/382; 235/492

(58) Field of Classification Search ............ 235/385, 235/383, 382, 382.5; 340/572.1, 572.8, 457.4, 340/10.1, 442, 435, 539.1, 539.12
See application file for complete search history.

(56) References Cited

U.S. PATENT DOCUMENTS

| | | | |
|---|---|---|---|
| 5,562,787 A | 10/1996 | Koch et al. | |
| 5,608,376 A | 3/1997 | Ito et al. | |
| 6,087,930 A * | 7/2000 | Kulka et al. | 340/447 |
| 6,484,080 B2 | 11/2002 | Breed | |
| 6,639,514 B1 * | 10/2003 | Muller | 340/572.5 |
| 6,724,301 B2 * | 4/2004 | Ginman et al. | 340/447 |
| 6,738,697 B2 | 5/2004 | Breed | |
| 6,988,026 B2 * | 1/2006 | Breed et al. | 701/29 |
| 7,005,987 B2 * | 2/2006 | Sinnett et al. | 340/572.1 |
| 7,116,213 B2 * | 10/2006 | Thiesen et al. | 340/10.1 |
| 7,180,409 B2 * | 2/2007 | Brey | 340/442 |
| 2003/0009270 A1 * | 1/2003 | Breed | 701/29 |
| 2003/0122661 A1 * | 7/2003 | Ginman et al. | 340/447 |
| 2004/0135675 A1 * | 7/2004 | Thiesen et al. | 340/10.1 |
| 2005/0073435 A1 * | 4/2005 | Voeller et al. | 340/933 |
| 2006/0042734 A1 * | 3/2006 | Turner et al. | 152/154.2 |
| 2006/0090558 A1 * | 5/2006 | Raskas | 73/146 |
| 2006/0124214 A1 * | 6/2006 | Bauchot et al. | 152/154.2 |
| 2006/0185429 A1 * | 8/2006 | Liu et al. | 73/146.5 |
| 2006/0208902 A1 * | 9/2006 | Brey | 340/572.8 |
| 2006/0232408 A1 * | 10/2006 | Nycz et al. | 340/572.1 |
| 2007/0008113 A1 * | 1/2007 | Spoonhower et al. | 340/539.12 |

FOREIGN PATENT DOCUMENTS

| | | |
|---|---|---|
| JP | 2000151480 A | 5/2000 |
| JP | 2000151481 A | 5/2000 |
| JP | 2002264617 A | 9/2002 |

* cited by examiner

*Primary Examiner*—Thien Minh Le
(74) *Attorney, Agent, or Firm*—Marcia L. Doubet; Gregory M. Doudnikoff

(57) ABSTRACT

Detecting wear through use of information-transmitting devices. At least one information-transmitting wireless device is provided for each of one or more wear positions of an item, wherein each of the devices is adapted for transmitting information to a reader, such that each of the devices can transmit information usable for detecting wear of the item as the item wears. When using a plurality of devices for a particular wear position, the devices may be stacked or placed in a depth-wise, end-to-end arrangement. As another alternative, a single device having a plurality of separable areas may be provided for each of one or more wear positions. As yet another alternative, a single device may be provided for each of one or more wear positions such that its failure to transmit indicates wear at the corresponding wear position. An information-transmitting device may become damaged or missing, due to item wear, and an RFID reader may therefore be unable to scan (i.e., receive data from) the device.

8 Claims, 11 Drawing Sheets

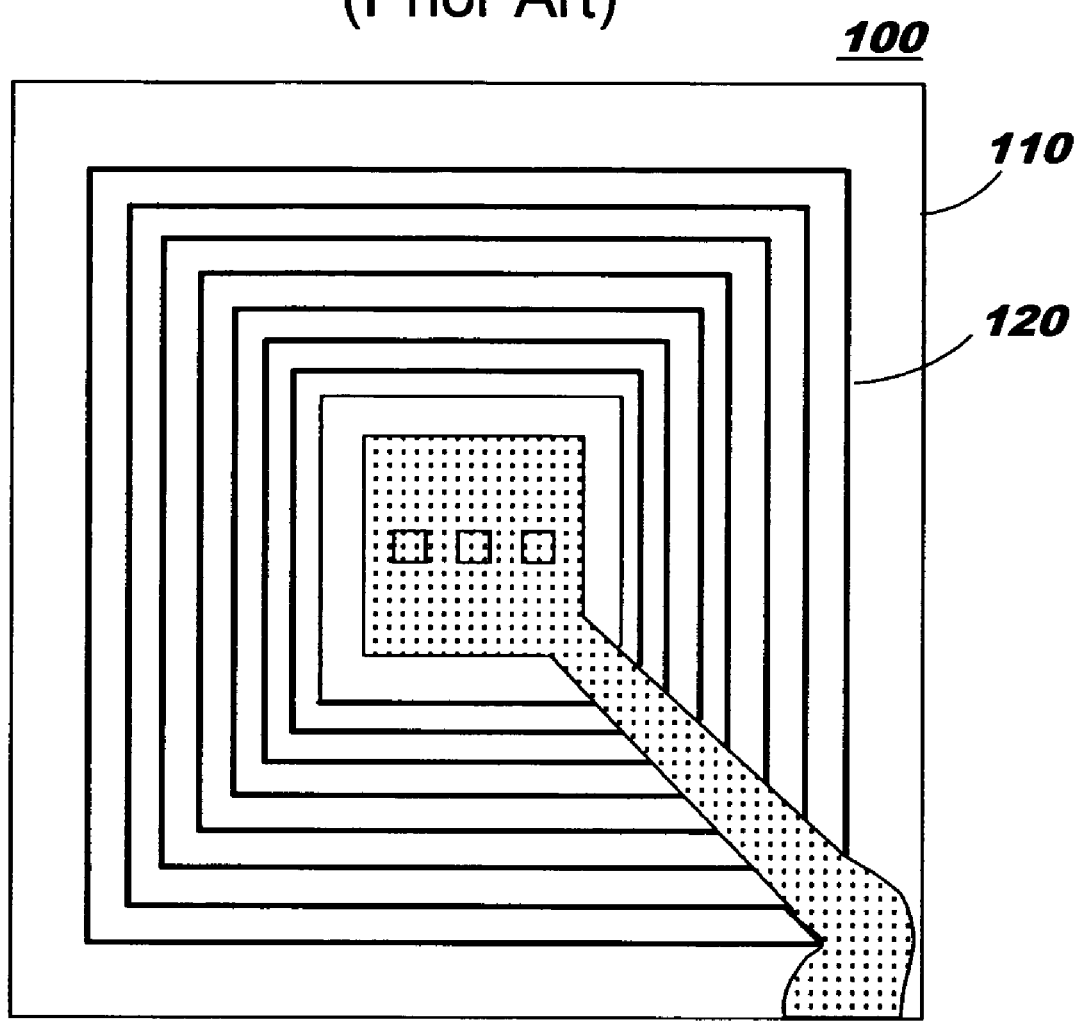

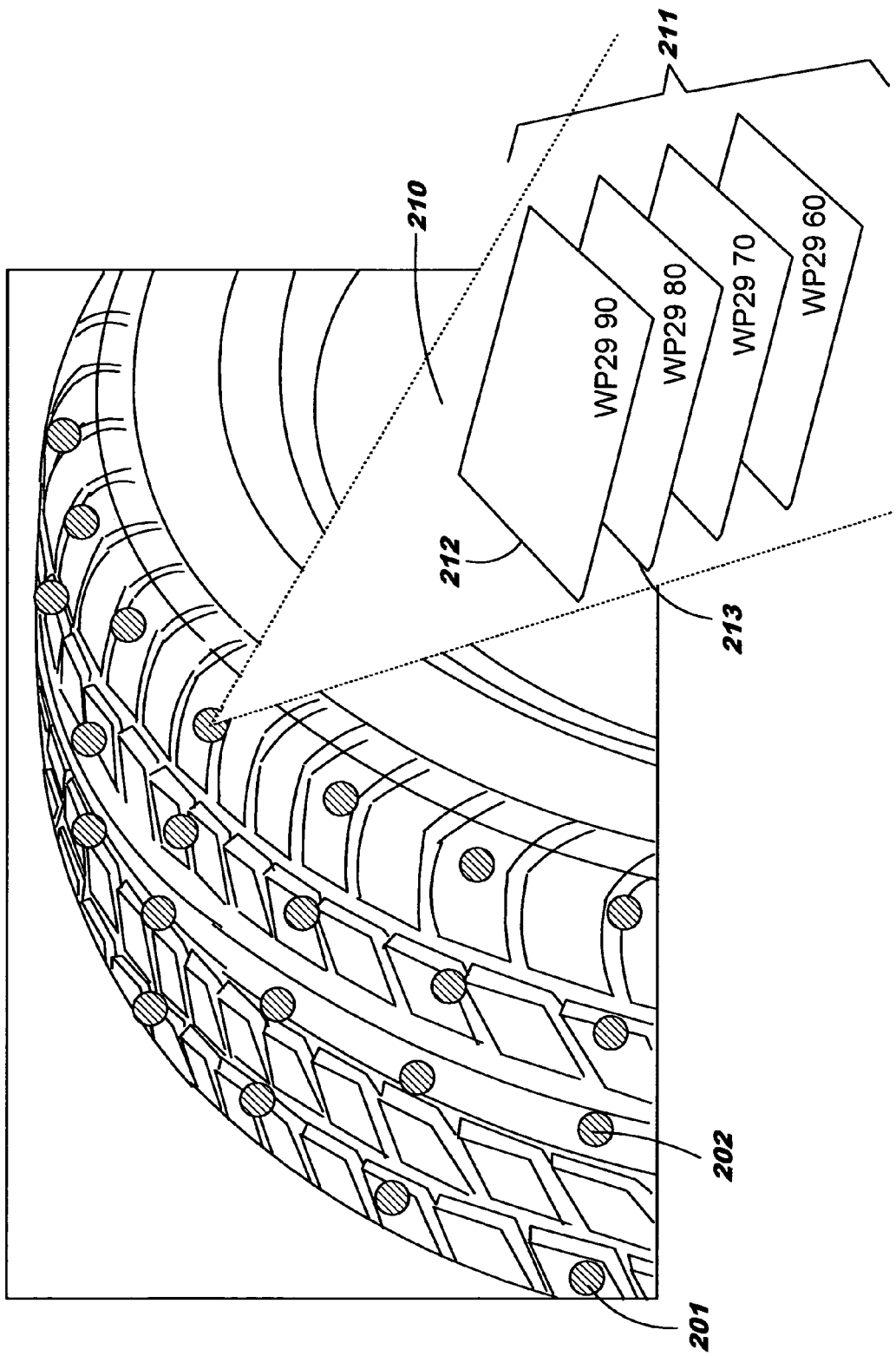

DETECTING WEAR THROUGH USE OF INFORMATION-TRANSMITTING DEVICES

BACKGROUND OF THE INVENTION

The present invention relates generally to information-transmitting devices (such as radio frequency identification, or "RFID", tags), and more particularly, the use of such devices for detecting wear of items.

Information-transmitting devices, such as those commonly referred to as RFID tags, may be used for labeling and tracking items of merchandise from manufacturing through distribution and retail sale. A typical RFID tag includes both passive elements (e.g., an antenna) and active elements (e.g., a read-write data memory, control circuitry, and a radio frequency transponder). RFID transmissions are, by definition, wireless. RFID tags are typically not self-powered, but may receive their power via capacitative coupling from an external radio frequency source. When brought into proximity with an RFID reader at a typical effective distance of about 1 centimeter to 5 meters (depending on the type of tag), the RFID tag receives sufficient power to enable clocking the semiconductor and analog portions comprising the transponder, control circuits, and data memory through enough clock cycles that the tag can return the data bits from its memory as a digitally-encoded RF signal. This is advantageous because the tag can be read (or written) from a distance without the necessity of line-of-sight, as had been required to read a bar code with a laser scanner.

RFID technology has generally been utilized for inventory control (e.g., in a warehouse, manufacturing, or distribution facility) and for item identification at the point of sale as an improvement over today's nearly ubiquitous laser-scanned bar codes. Several large retailers have indicated a desire to begin using RFID tagging on all their inventory. The cost of RFID tags is expected to decline to the point of being cost-effective even on small-value retail items.

BRIEF SUMMARY OF THE INVENTION

In one aspect, the present invention comprises a method of detecting wear through use of information-transmitting devices, comprising a step of providing at least one information-transmitting wireless device for each of one or more wear positions of an item, wherein each of the devices is adapted for transmitting information to a reader, such that each of the devices can transmit information usable for detecting wear of the item as the item wears.

In another aspect, the present invention comprises a system for detecting wear through use of information-transmitting devices, comprising at least one information-transmitting wireless device provided for each of one or more wear positions of an item, wherein each of the devices is adapted for transmitting information to a reader, such that each of the devices can transmit information usable for detecting wear of the item as the item wears.

In yet another aspect, the present invention comprises a computer program product for detecting wear through use of information-transmitting devices, the computer program product comprising computer-readable code embodied on one or more computer-usable media, the computer-readable code comprising instructions that when executed on a computer cause the computer to receive wear-related information from at least one information-transmitting wireless device provided for each of one or more wear positions of an item, each of the devices adapted for transmitting the wear-related information, and to use the received wear-related information for detecting wear of the item.

When using a plurality of devices for a particular wear position, the devices in the various aspects may be stacked or placed in a depth-wise, end-to-end arrangement. As another alternative, a single device having a plurality of separable areas may be provided for each of one or more wear positions. As yet another alternative, a single device may be provided for each of one or more wear positions such that its failure to transmit indicates wear at the corresponding wear position. An information-transmitting device may become damaged or missing, due to item wear, and an RFID reader may therefore be unable to scan (i.e., receive a signal from) the device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 1 illustrates a representative RFID tag, according to the prior art;

DETAILED DESCRIPTION OF THE INVENTION

Figure 2C:
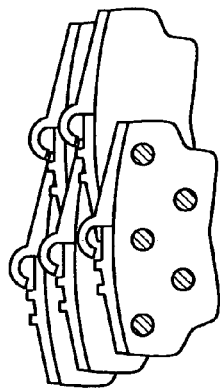
FIG. 2 (comprising FIGS. 2A-2D) illustrates sample positionings of RFID tags in a stacking arrangement.

Embodiments of the present invention enable detecting (referred to herein equivalently as "measuring") wear of items using information-transmitting tags. For example, the tags may be embedded or otherwise attached to an item; as another example, a tag might be placed in a receptacle of an item. Degree of wear may be measured. Wear patterns may be detected across one or more wear positions. Notifications pertaining to wear may be generated.

Through use of techniques disclosed herein, the time and skill it takes to routinely inspect items for degree of wear and/or proper wear patterns can be reduced. In addition, knowing when to replace items that wear, thereby improving safety and/or comfort, is facilitated. A wear pattern that does not fall within a threshold of an expected rate might indicate, for example, that the corresponding item is improperly installed or is defective.

RFID tags can be created using relatively inexpensive manufacturing techniques, and the tags can be attached to an item, embedded within the item, placed on packaging material of the item (using conductive carbon ink, for example), and so forth. As another alternative, an RFID tag might be embodied independent of an item to be monitored with the tag (as discussed in more detail with reference to FIG. 7, below.) The semiconductor portion may be as small as 3 millimeters square, and can be mounted to the antenna with glue.

The read-write data memory in today's RFID tags is non-volatile and typically has a capacity of 5 to 256 bytes. As use of RFID tags becomes increasingly popular, memory capacity may increase. In prior art uses, the memory typically stores an "Electronic Product Code" or "EPC", a counterpart of the bar code, that assigns a searchable number to each item. The EPC uniquely identifies an item individually (including product type, serial number, etc.), not just by item type. Present versions of the code use 96 bits of information, which comprises an 8-bit header, two sets of 24 bits that identify the manufacturer and the item type (respectively), and a 40-bit serial number. Ninety-six bits encode enough information to uniquely identify trillions of items. See "Beyond the Bar Code" and companion article "What's My Number" by Charlie Schmidt, *Technology Review Magazine*, March 2001, pp. 80-85.

As an alternative to use of an EPC, an RFID tag may bear an item SKU ("stock-keeping unit") and a unique item serial number. An SKU is an identifier used for categorizing items, for example by item type. The serial number may be globally unique, or unique within the SKU number. A combination of SKU and serial number may therefore be used to uniquely identify a particular item of that particular type.

When using either an EPC or an SKU with serial number, this information is stored in the small memory area on the RFID tag of the item. When power is supplied to the RFID tag's antenna from an RFID reader, the information stored in the memory area can be read and transmitted to the RFID reader. A representative RFID tag 100 of the prior art is illustrated in FIG. 1, showing a coiled antenna 120 (which in this example takes on a generally square shape) embodied on some type of substrate 110.

Note that while discussions herein refer primarily to using RFID "tags", this is not meant to limit the present invention to use with a particular physical form of RFID implementation. RFID tags may be more generally referred to as transponders. An RFID tag may be attached to an item, may be embedded into the item, or may be provided in an embodiment independent from an item, and it is not necessary that the physical embodiment of the RFID components resembles a tag. (Furthermore, it should be noted that while discussions herein are primarily in terms of RFID technology, this is by way of illustration and not of limitation. Other information-transmitting technology may be substituted without deviating from the scope of the present invention. In addition, the term "RFID reader" is used herein by way of illustration, and other interrogating devices may be substituted.)

In several embodiments, RFID technology (referred to herein as an RFID tag by way of illustration) is impregnated in or otherwise attached to an item for which the item wear is of interest. FIGS. 2-5 are illustrative of these embodiments. The RFID tag or tags are preferably positioned in key wear spots and positioned in a way that permits accurate measurement of item wear. In yet other embodiments, wear is detected using RFID tags that are independent of an item. FIGS. 6 and 7 are illustrative of these embodiments.

As one example of how RFID tags may be positioned on an item, an ordered sequence of RFID tags may be stacked, one of top of another, at one or more wear positions of interest. In a stacking embodiment, as the item wears, stacked RFID tags are removed from the stack (e.g., by wearing away or falling off as the item deteriorates) and thus are damaged or missing and cannot be scanned by the RFID reader. An RFID reader can then determine, by reading from functional tags remaining in the stack, how much wear has occurred. For example, if the RFID reader continues to receive information from the topmost tag, this indicates that the item is probably not yet degraded at that wear position, and an assumption can be made that the remaining tags are still in the stack. Conversely, if the RFID reader does not receive information from particular ones of the tags in the stack, then it may be assumed that those tags have been removed (or if tags higher in the stack are still transmitting to the RFID reader, then the non-transmitting tags may be too deeply embedded in the item). Refer to the discussion of FIG. 2, below, where a stacking embodiment is further described.

As another example of how RFID tags may be positioned on an item, a tag might be positioned depth-wise along a wear position of interest, with the tag providing a range of information at varying depths. In a depth-wise embodiment, as the item wears, portions of the tag wear away, thus removing the associated portions of the tag's information. Typically, a tag used in this manner can continue to transmit information, even if it is partially damaged. For example, a tag might be divided into quadrants, and if one of the quadrants breaks off or wears away, the tag may detect this and adapt the wear-related information it transmits accordingly. Refer to the discussion of FIG. 3, below, where a depth-wise embodiment is further described.

As yet another example of how RFID tags may be positioned on an item, a tag might be placed in a connecting embodiment. In a connecting embodiment, if portions of the item cease to connect (e.g., due to wear or damage, such as expansion, contraction, bending, or twisting), the RFID tag can be used to detect that the connection is impaired. Refer to the discussion of FIG. 4, below, where a connecting embodiment is further described.

In an automotive example (used by way of illustration but not of limitation), items that may wear on the automobile may (for example) have RFID tags applied thereto or embedded therein. Suppose, for example, that wear patterns and/or degree of wear are to be monitored on an automobile's tires, brake pads, and/or rotors. Manufacturers of these components may provide one or more RFID tags for each item, and/or tags may be applied by another entity such as the automobile assembler, tire retailer, and so forth. In some cases, a manufacturer might supply a physical or digital map of an item, suggesting preferred locations for positioning RFID tags. Industry standards may be adopted that specify information pertaining to positioning such tags for particular items. Standards might be prescribed for use with tires, for example, to indicate where such tags should be provided on particular types of tires and the number of tags that should be used for optimal results. Alternatively, proprietary implementations may be provided for placement of tags on items, and might (for example) be used in a competitive environment to emphasize the tagged item's enhanced safety as contrasted to its competitors.

Sample tag positionings according to the exemplary embodiments noted above are shown in FIGS. 2-7, as will now be described.

FIG. 2A illustrates how a plurality of RFID tags might be located in a stacking arrangement on the surface of a tire (e.g., on the treads, which should be monitored regularly for wear). In this example, a number of wear positions of interest are identified, and a plurality of tags are stacked at each position. For ease of illustration, the general placement of stacked tags at each wear position is shown graphically using circles containing diagonal hash mark symbols. See, for example, reference numbers 201, 202. FIG. 2A also provides a graphic 210 in which the stacking of tags at a particular wear position is illustrated in more detail. This sample stack of tags 211 has a wear position ("WP") identifier associated therewith, and for this example, the wear position identifier for the stack is "WP29". Graphic 210 further illustrates that, by way of example, a topmost tag 212 contains information indicating that the tire retains 90 percent of its usable tread when this tag is exposed (and therefore readable). The next-lower tag 213 contains information indicating that, once the tire wears to the point where this tag is exposed, the tire retains 80 percent of its usable tread, and so on.

It may happen in some scenarios that an RFID reader receives signals from more than one tag from the stack at a particular wear position. For example, if the tags are stacked in cardboard material of a cardboard container, the reader may receive signals from several of the tags in a particular stack. The signals might be received, for example, from several tags at the top of the stack; as another example, signals might be received from the top-most and bottom-most tags in a stack. An algorithm is preferably used that factors out all but the most-relevant signals in such scenarios. Alternatively, an algorithm might be adapted for determining that, when (for example) 50 percent of the tags respond to the RFID reader, then 50 percent of the item has worn away.

As will be obvious once the teachings provided herein are known, one or more embodiments may reverse the numbering illustrated in FIG. 2A, such that each next-lower tag specifies an increasing percentage that represents increased degree of wear (rather than the percentage of remaining usable material, as in FIG. 2A). Furthermore, the number of tags to be stacked for a particular usage, and the degree or percent represented by each tag, may vary according to the item for which wear is to be monitored. In some scenarios, for example, it may be sufficient to use a small number of tags, such as two tags that report percentages of 100 percent and 50 percent.

Figure 2D:
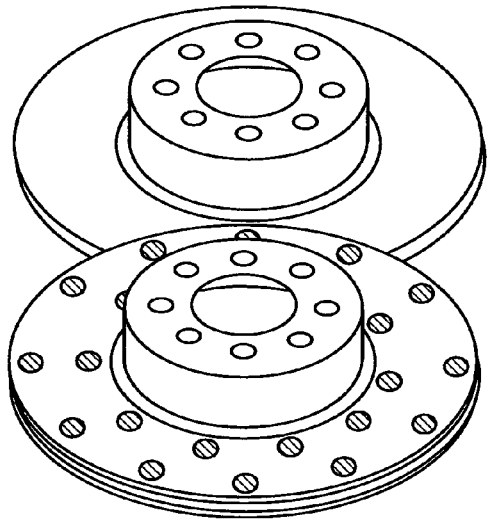
Figure 2B:
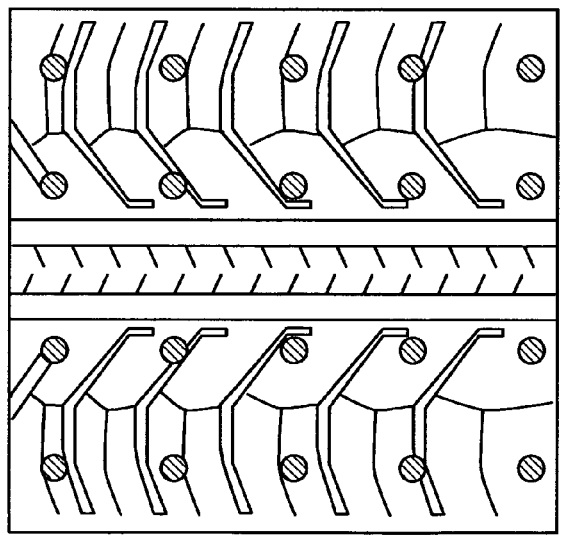

FIG. 2B shows another illustration of tag placement on a tire, providing an alternative perspective to that of FIG. 2A. Additional automotive examples are illustrated in FIGS. 2C and 2D, which indicate how stacked tags might be positioned (i.e., embedded, in this example) within an automotive disc brake pad and an automotive rotor, respectively.

Using the stacked RFID tags is preferably implemented by providing an RFID reader that reads an RFID-readable identifier borne on a tag, along with additional information encoded in the tag. In an automotive scenario, for example, an RFID reader might be provided in equipment used at an automobile repair shop, such that the tags of interest can be scanned for reporting their wear-related information to an automotive technician (e.g., by providing information for display on a device console located in the repair shop). Or, as one alternative, an RFID reader might be integrated into an automobile. When used with tires, for example, an RFID reader positioned in the wheel well might scan the tags in the tire for wear as they reach the "twelve o'clock" (i.e., upright) position. As another (non-limiting) alternative, a single RFID reader may have the capability to scan all tags in the wheel well or throughout the entire automobile at any given instant. Information from the tags may be reported (for example) through dashboard displays.

Implementations of the present invention may provide information as to degree of wear and/or remaining usable material at wear positions of a particular item, as discussed above. As an alternative, it may be important to monitor whether an item is wearing evenly and/or at an expected rate. For example, data may be collected from the various wear positions of the tire illustrated in FIGS. 2A and 2B to determine whether the overall tire tread is wearing correctly. Or, it may be useful to know whether separate but mated items, such as a pair of brake pads, are wearing in the same fashion. In such a scenario, data collected from corresponding wear positions on the mated items may be compared, and a warning may be generated if the wear patterns are different beyond some tolerance.

Percentage of wear may be monitored for items (including mated items), in addition to their rate of wear. For example, an automobile may periodically record the brake pads' percentage of wear in non-volatile memory, along with time and mileage. If within 1,000 miles, the brake pads wear from 90 percent remaining to 60 percent remaining, for example, the automobile may generate a warning for the driver due to the unexpected rapid wear rate. Faster-than-expected or slower-than-expected wear rates could mean defective parts or incorrect installation.

When data has been read from tags, that data may be used in a variety of ways without deviating from the scope of the present invention. For example, an automobile driver might be provided with dashboard messages, as noted above, where these messages may indicate information such as improper wear patterns, degree and/or rate of wear, current wear percentage remaining, and so forth. Or, as one alternative to providing messages for display on the automobile's dashboard, messages might be transmitted to a printer, diagnostic console, email system, etc.

As one alternative, instead of (or in addition to) generating messages or reports of wear-related information obtained from RFID tags, the wear-related information may be used to alter the characteristics of the monitored item. Such alterations may be made, as one example, when the wear-related information indicates an abnormal wear pattern. For example, an automobile, lawnmower, or other vehicle may be outfitted with a control mechanism that prevents the vehicle from being started if the detected wear on a critical item is deemed to be outside specified tolerance values or otherwise dangerous, thereby potentially protecting the vehicle's operator from harm.

Through use of the present invention, notification can be provided of potentially unsafe conditions. Because transmission of data from the RFID tags is automatically activated upon coming into proximity of an RFID reader, reliance on a human to search out and detect wear patterns of concern is avoided. In addition, using an automotive scenario by way of illustration, interrogating the RFID tags with an RFID reader can be achieved without requiring the automobile to be placed on a jack and raised for inspection, in contrast to techniques commonly employed for problem detection by humans, thereby potentially lowering costs of problem detection. For example, RFID readers could be mounted to the garage entrance in such a way that as an automobile enters the garage, the automobile's RFID tags are automatically read. Furthermore, no expert knowledge is required by a human as to what types of wear represent potential problems, where to search for wear, and so forth. Human error is also avoided, whereby a human inspector might (for example) overlook a dangerous flattened spot on a tire tread. A number of systems in an automobile might be inspected in an automated manner using RFID tags on such systems, using techniques disclosed herein.

Figure 3A:
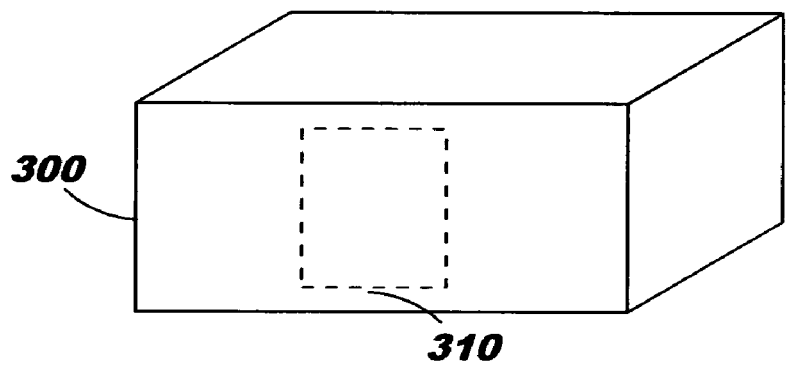
FIG. 3 (comprising FIGS. 3A-3C) illustrates sample positionings of RFID tags in a depth-wise arrangement.
Figure 3B:
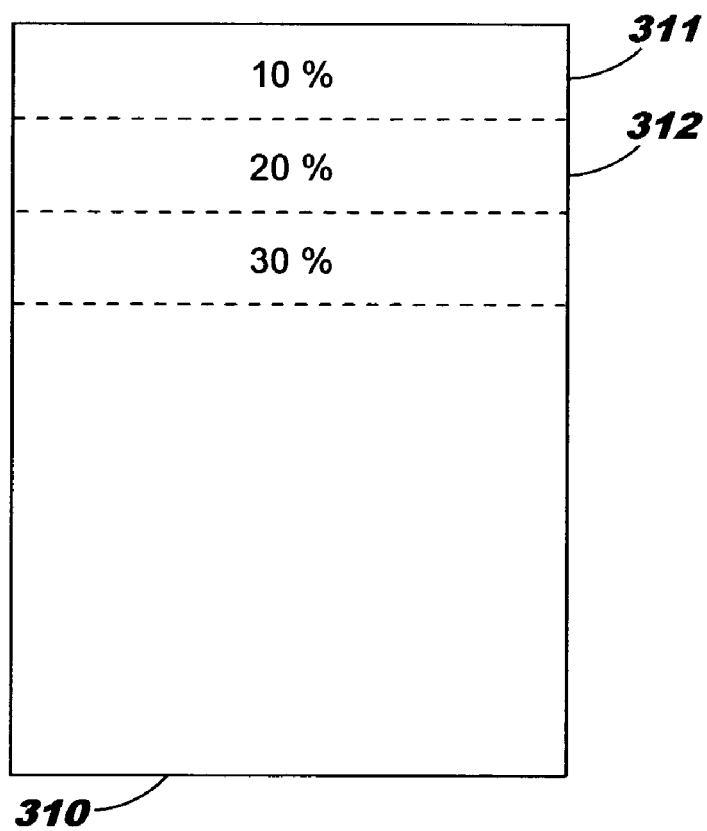

FIG. 3A shows a sample positioning of an RFID tag in a depth-wise arrangement. In this example, a tag 310 has been embedded depth-wise in an item 300 for which wear is to be monitored. FIG. 3B shows this sample tag 310 in more detail. As shown therein, an uppermost portion 311 of tag 310 contains information indicating that the wear corresponding to this portion is 10 percent; a next-lower portion 312 represents 20 percent wear, and so forth. In this example, as item 300 wears away by 10 percent, an RFID reader can detect a signal corresponding to the upper portion 311 of the embedded tag 310. As the item then wears away by another 10 percent, the upper portion 311 of the tag 310 will be exposed and may either wear away or break off (or otherwise separate from the remainder of the tag). The RFID reader will then cease receiving a signal corresponding to portion 311, and a signal corresponding to portion 312 will then become readable, such that the RFID reader can report the increased degree of wear. The tag itself may be adapted for knowing when each of its portions is no longer present, for example, and may report information to the RFID reader accordingly.

The depth-wise arrangement shown in FIGS. 3A-3B may be used with items such as tires, as an alternative to the stacked arrangement in FIG. 2, whereby tag 310 is positioned depth-wise along a tire tread and wears away or breaks off as the amount of tire tread is reduced. (Refer also to the discussion of FIG. 7, below. The tag illustrated therein may be used in scenarios where detecting wear from multiple sides of an item is desired.)

Figure 3C:
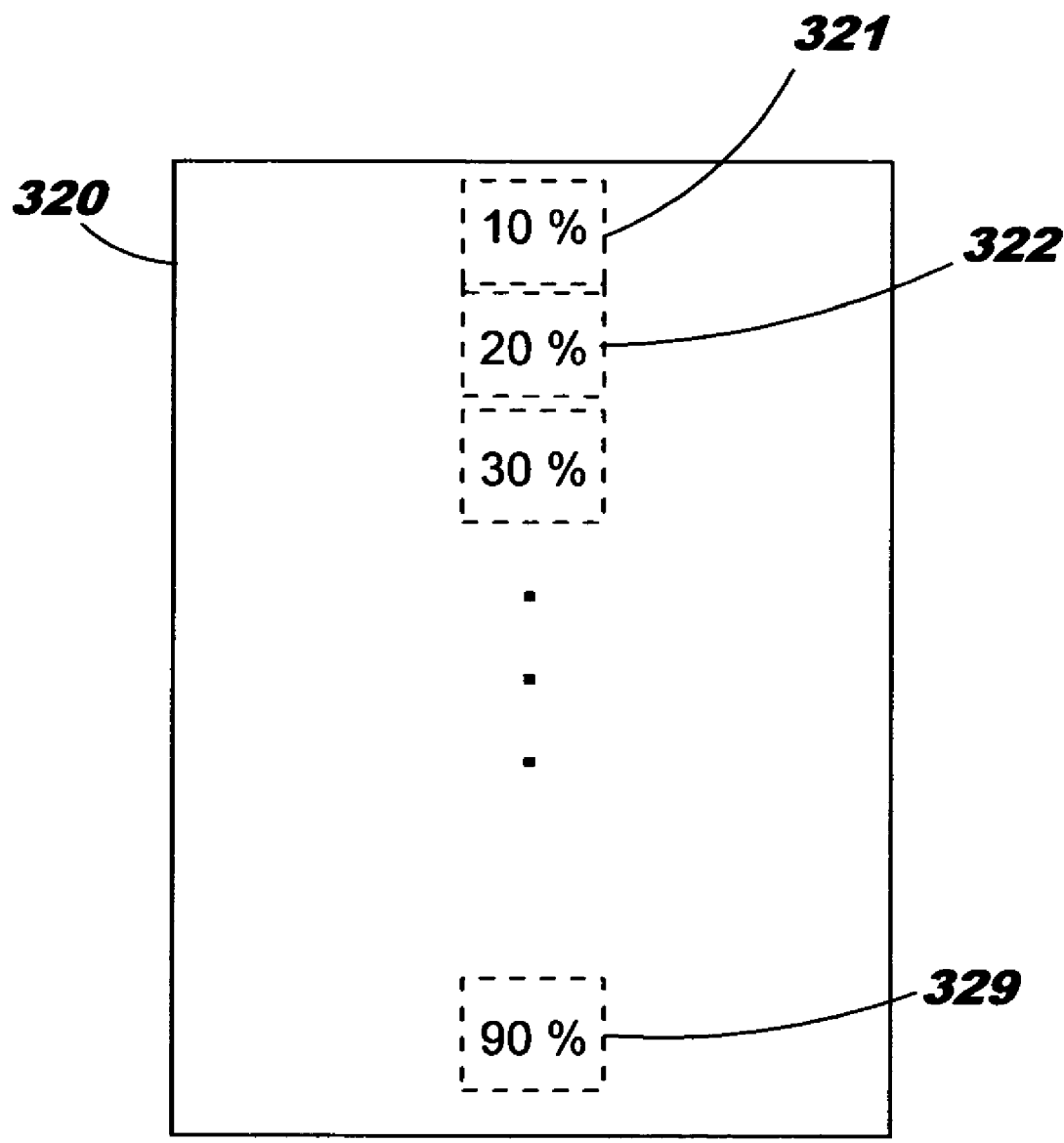

As an alternative to using a single tag 310 with separable portions, individual tags may be placed depth-wise (i.e., end-to-end) along the wear position. This is illustrated in FIG. 3C, where an item 320 has a plurality of RFID tags 321, 322, . . . 329 placed end-to-end along a wear position. In this approach, each individual tag is preferably responsible for transmitting a particular percentage of wear, similar to the stacked tags of FIG. 2.

Figure 4:
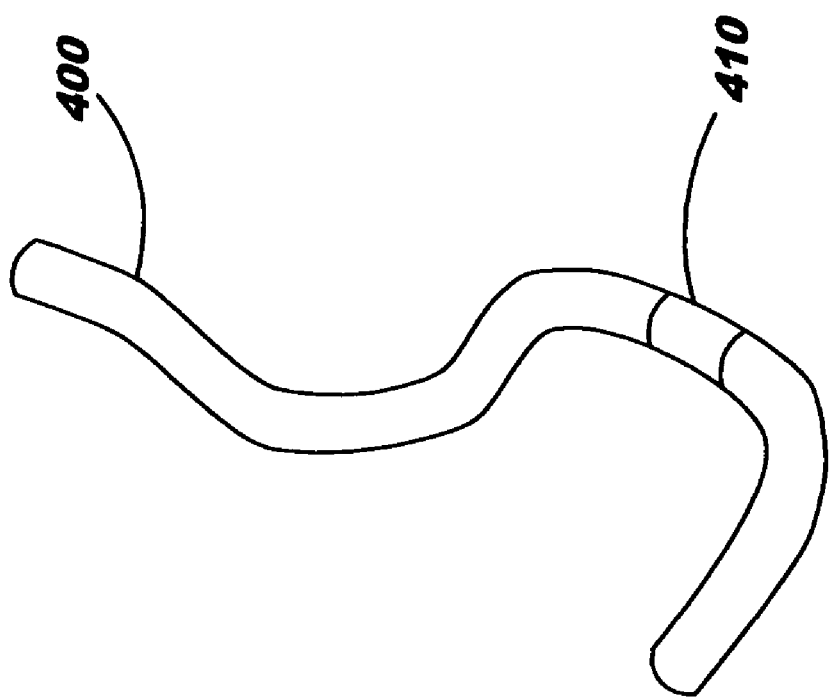
FIG. 4 illustrates a sample positioning of RFID tags in a connecting arrangement.

FIG. 4 illustrates a sample positioning of RFID tags in a connecting arrangement. As shown therein, a tag 410 may be placed on a hose 400. While the hose is in operable condition, tag 410 may transmit information indicative of this condition. For example, the tag may transmit its identifier and (optionally) other information such as its location. However, suppose the hose expands (e.g., by stretching) or contracts, either of which may impair its operation. If the hose expands, for example, it may pull RFID tag 410 apart, disabling it, or otherwise cause RFID tag 410 to stop functioning. Similarly, if the hose contracts, it may squeeze RFID tag 410 together, disabling it, or otherwise cause RFID tag 410 to stop functioning. Upon failing to detect a signal from the tag 410, an RFID reader can be adapted for transmitting a notification of the failure (and this notification can be used, for example, to generate a message to a user).

Embodiments discussed heretofore are primarily in terms of detecting wear by failing to read a particular tag or tags. In other embodiments, however, wear may be detected by reading new or unexpected tags. "New", for example, might mean that a particular reader found some number "X" tags in a system throughout the past month, while today it finds two additional tags. "Unexpected" might mean, for example, that the reader logic is adapted to expect three tags and only three tags, whereas any other tags (without regard to timing) would be considered unexpected. FIGS. 5 and 6 illustrate these scenarios in more detail, as will now be discussed.

Figure 5A:
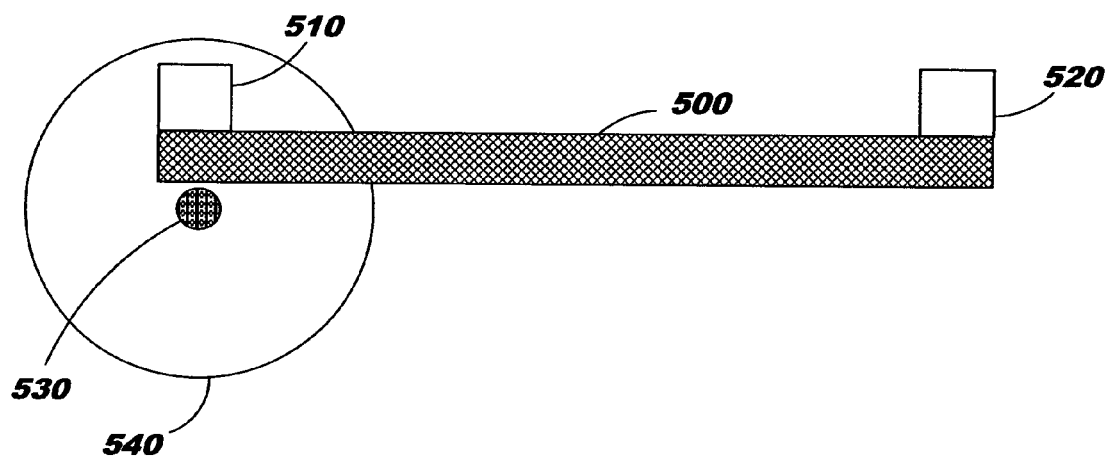
FIG. 5 (comprising FIGS. 5A and 5B) illustrates use of RFID tags to detect that an item containing multiple tags has failed (e.g., by breaking)
Figure 5B:
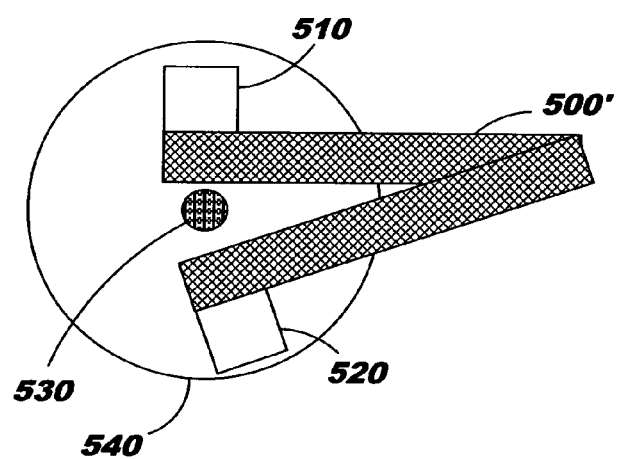

In FIG. 5A, the item to be monitored is represented as a bar 500. An RFID tag is located, by way of example, on each end of this bar. See reference numbers 510 and 520. An RFID reader 530 is capable of reading tags within a range shown generally by reference number 540. Thus, in the scenario of FIG. 5A, RFID reader 530 can read (i.e., receive transmissions from) RFID tag 510 but not RFID tag 520. Now suppose that the bar 500 fails, for example by breaking as shown by bar 500' in FIG. 5B. This causes RFID tag 520 to come into proximity of RFID reader 530, such that two tags 510, 520 are now scanned instead of the single tag 510 in FIG. 5A.

Figure 6A:
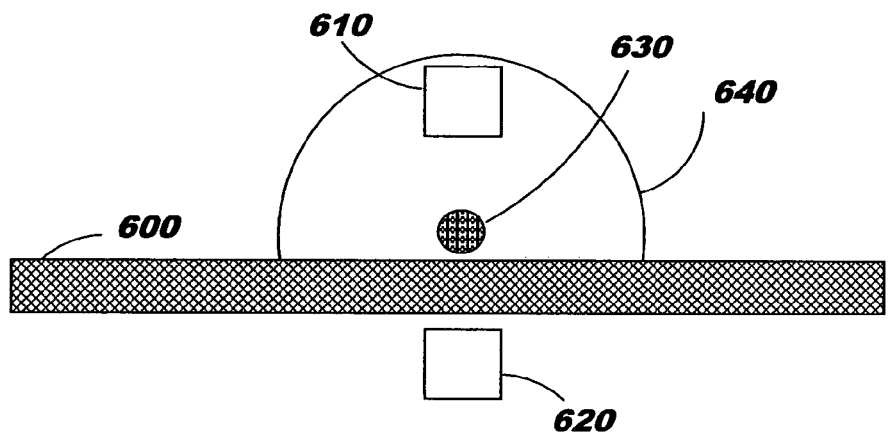
FIG. 6 (comprising FIGS. 6A and 6B) illustrates an alternative use of RFID tags to detect that an item has failed (e.g., by breaking)
Figure 6B:
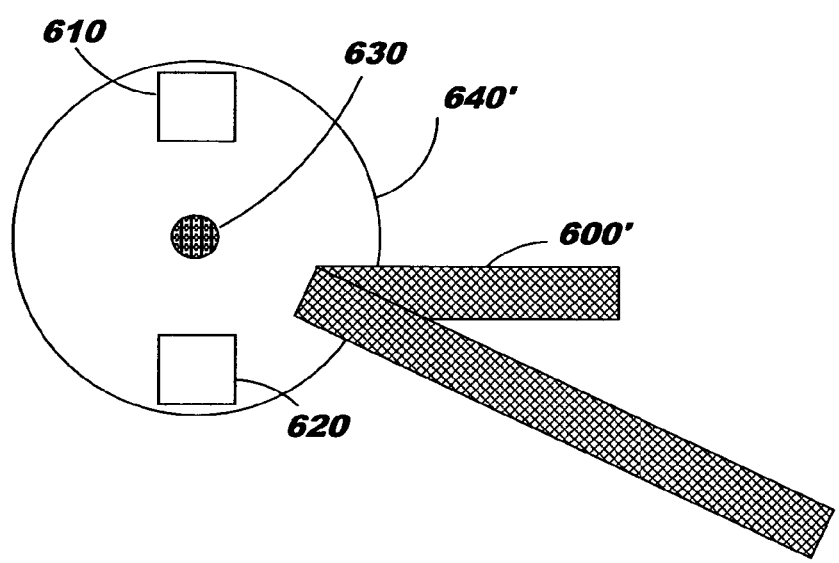

FIG. 6 illustrates another scenario where reading one or more additional tags may signal item wear. In this scenario, a plurality of tags are used, but one or more of those tags is not physically attached to, or embedded within, an item to be monitored. FIG. 6A shows a bar 600 that is to be monitored. By way of example, two RFID tags 610, 620 are located in proximity of bar 600, but neither tag is attached to the bar. An RFID reader 630 is capable of reading tags within a range shown generally by reference number 640. Suppose that bar 600 is formed of a substance that blocks radio-frequency transmissions. Thus, in the scenario of FIG. 6A, RFID reader 630 can read RFID tag 610 but, even though RFID tag 620 may be within a proper physical proximity for communicating with reader 630, the material of bar 600 blocks the communication. Now suppose that the bar 600 fails, for example, by breaking as shown by bar 600' in FIG. 6B. FIG. 6B shows that RFID tag 620 is now within range 640' of reader 630, enabling the reader 630 and tag 620 to communicate, such that two tags 610, 620 are now scanned after the bar has broken, instead of the single tag 610 in FIG. 6A.

As will be obvious to the reader, the scenarios illustrated in FIGS. 5 and 6 are illustrative but not limiting. In other scenarios, for example, additional tags might be used.

Figure 7A:
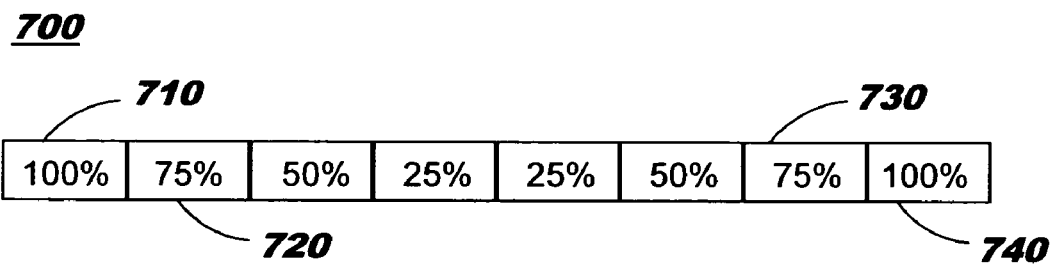
FIG. 7 (comprising FIGS. 7A and 7B) depicts an RFID tag adapted for detecting item wear from multiple sides, where the tag may or may not be physically attached to the item.

FIG. 7A depicts an RFID tag adapted for detecting item wear from multiple sides. As shown therein, tag 700 is configured in a rectangle shape, capable of detecting item wear evenly from its two ends, although this is by way of illustration only. For example, if tag 700 is embedded within an item such that tag 700 extends generally from one side of the item to an opposite side, then wear on either of the sides can be detected by determining which of portions 710, 720, . . . 730, 740 continue to transmit to an RFID reader. If portion 710 remains operable while portion 740 does not, for example, this may indicate an uneven wear pattern on one side of the item, where this uneven wear pattern should be reported to a user of the item. The wear rate of mated items might be measured using an RFID tag of the type shown in FIG. 7A.

Figure 7B:
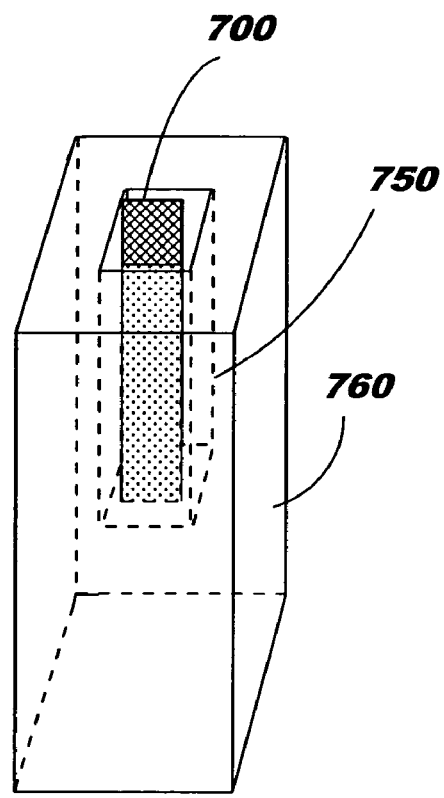

FIG. 7 also illustrates another embodiment of an RFID tag that is not necessarily required to be physically attached to the item to be monitored for wear. Rectangular tag 700, for example, might be used advantageously by dropping it into a receptacle of an item. This is further illustrated in FIG. 7B: no matter which end of tag 700 ends up at the top of the receptacle 750 in item 760, tag 700 can be used for detecting wear.

Usage of information from the tags to detect wear will now be discussed in more detail. A "base" RFID tag may be provided for an item, where this base tag stores item-specific information. For example, such information may comprise identifying information such as the item's EPC, its SKU, its unique item serial number, or some combination thereof. Or, an item name or other type of identifier might be stored. Depending upon the item, the base RFID tag may also store information such as a threshold percentage of wear at which the item should be replaced for wear positions overall, or for different subsets of wear positions. The item's base tag might indicate the expected number of associated wear tags for wear positions overall, for each individual wear position, or for different subsets of wear positions. A base tag may be considered as a "parent" tag, and preferably contains all the necessary information to identify the wear tag characteristics and thresholds of its corresponding "child" wear tags. A base tag may contain information (e.g., a string or header) that explicitly identifies it as a base tag. Each wear tag may be unique so that it can be identified by the RFID reader as such. For example, in FIG. 7A, in addition to other data, portion 720 may contain "75%" while portion 730 contains "−75%", thus uniquely identifying such wear tag. In certain applications, however, wear tag uniqueness across all or a subset of tags may not be necessary or desired. For example, twelve identical wear tags could be placed at strategic points in a masonry brick. If all twelve wear tags are readable when the brick is scanned by an RFID reader at an inspection station, it is determined (for example) that the brick is not damaged and thus passes inspection. In a similar regard, wear position uniqueness across all or a subset of tags may not be necessary or desired. As one example, across a subset of wear positions with identical wear position identifiers for an item, if a wear tag for one or more of those positions transmits "60%", the item is determined to be damaged. Additionally, a base tag or tags may not be necessary or desired. For example, in the masonry brick example above, a base tag might not provide any value to the inspection process, and thus the base tag might not be implemented. A base tag might store information indicating what types of messages should be reported when different degrees of wear are detected from its corresponding child wear tags (e.g., by storing message identifiers that can be mapped to message text). Other types of item-specific wear information might be provided on the item's base tag, without deviating from the scope of the present invention. Zero, one, or multiple base tags might be provided for an item. Multiple such tags may be desirable (for example) for purposes of redundancy, combined storage capacity, or both. When located in or on an item, the base tag may be located in a position that should not, under ordinary circumstances, experience any wear. When provided, the base wear tag or tags may or may not be in close proximity with corresponding child wear tags, and multiple base tags (when used) may or may not be within close proximity of one another. Similarly, wear tags in general may or may not be in close proximity of one another (or their parent base tag, if present).

Data provided on individual wear tags may comprise a name or other identifier of the item to which the tag corresponds, the percentage of wear represented by that tag (as discussed above with reference to FIG. 2A, for example) or portions thereof (as discussed above with reference to FIG. 3B, for example), the wear position for which that tag is to detect wear, and so forth.

A base tag might indicate, for example, that a certain item should be replaced when any of its RFID tags (or perhaps some number or pattern thereof) reports wear in excess of 80 percent. Suppose that, upon receiving transmissions from the item's wear tags, wear in excess of 80 percent is reported from wear positions numbered 34, 36, and 51. A warning message may then be generated to inform a user of this information. It may be deemed useful in some scenarios to provide a physical or digital wear position map corresponding to a particular item, indicating (for example) where the RFID tags having certain identifiers are located on the item.

An RFID reader may be adapted for reading information from a base tag and its corresponding child wear tags, and may use information obtained from the base tag to determine (for example) how many child wear tags should be available (i.e., scannable) for the item and where those tags should be located. In an alternative approach, use of separate base tags may be omitted. In this approach, the RFID reader may report the information it receives from the wear tag or tags for an item, such that an interpretation of that information can be obtained (for example) by consulting a reference manual for the item.

Figure 8:
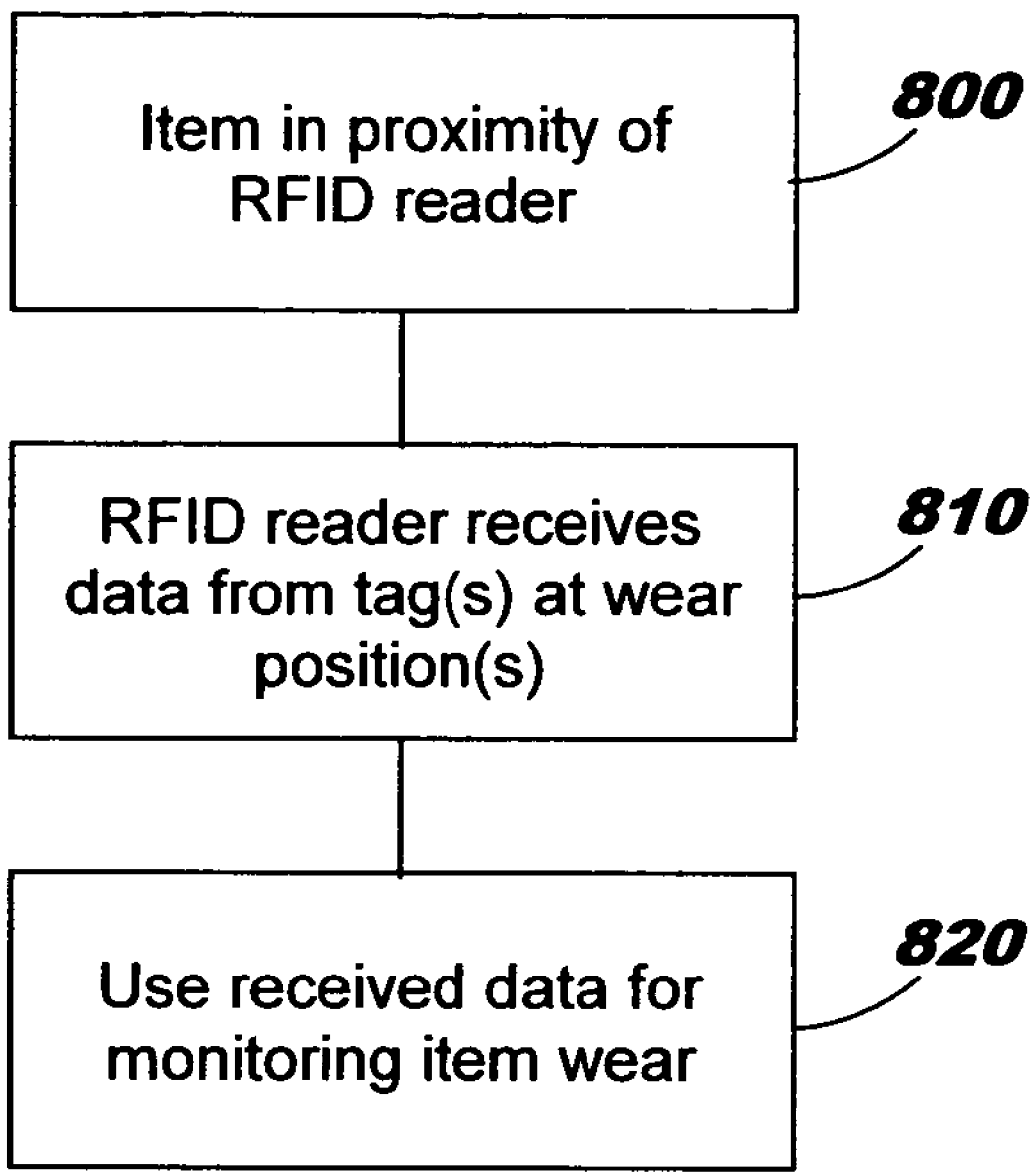
FIG. 8 provides a flow diagram showing use of RFID tags for detecting wear.

Referring now to FIG. 8, a flow diagram is provided showing use of the RFID tags disclosed herein. A tagged item comes into proximity of an RFID reader (Block 800), causing the tag(s) for the item to transmit data that is received by the reader (Block 810). This received information may then be used in varying ways (Block 820), depending on factors such as the item, the number of tags transmitting information, the degree of wear represented by the transmission, and so forth, as has been discussed above. Preferably, one or more messages is generated, and may be conveyed to a user, displayed on a console, recorded in a log, and so forth.

Techniques disclosed herein may be used with a wide variety of items. As one example, tags might be placed on the soles of running shoes to determine wear patterns of the shoes. As another example, tags might be placed at various locations on lawn mower blades to determine wear patterns of the blades. Many other usages will become apparent, once the teachings disclosed herein are known, and such other usages are considered to be within the scope of the present invention.

As will be appreciated by one of skill in the art, selected components of the present invention may be provided as methods, systems, and/or computer program products comprising computer-readable program code. Accordingly, the present invention may take the form of an entirely hardware embodiment. An embodiment combining software and hardware aspects might be used alternatively.

Furthermore, components of the invention may take the form of a computer program product accessible from computer-usable or computer-readable media providing program code for use by, or in connection with, a computer or any instruction execution system. For purposes of this description, a computer-usable or computer-readable medium can be any apparatus that can contain, store, communicate, propagate, or transport a program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, removable computer diskette, random access memory ("RAM"), read-only memory ("ROM"), rigid magnetic disk, and optical disk. Current example of optical disks include compact disk with read-only memory ("CD-ROM"), compact disk with read/write ("CD-R/W"), and DVD.

Figure 9:
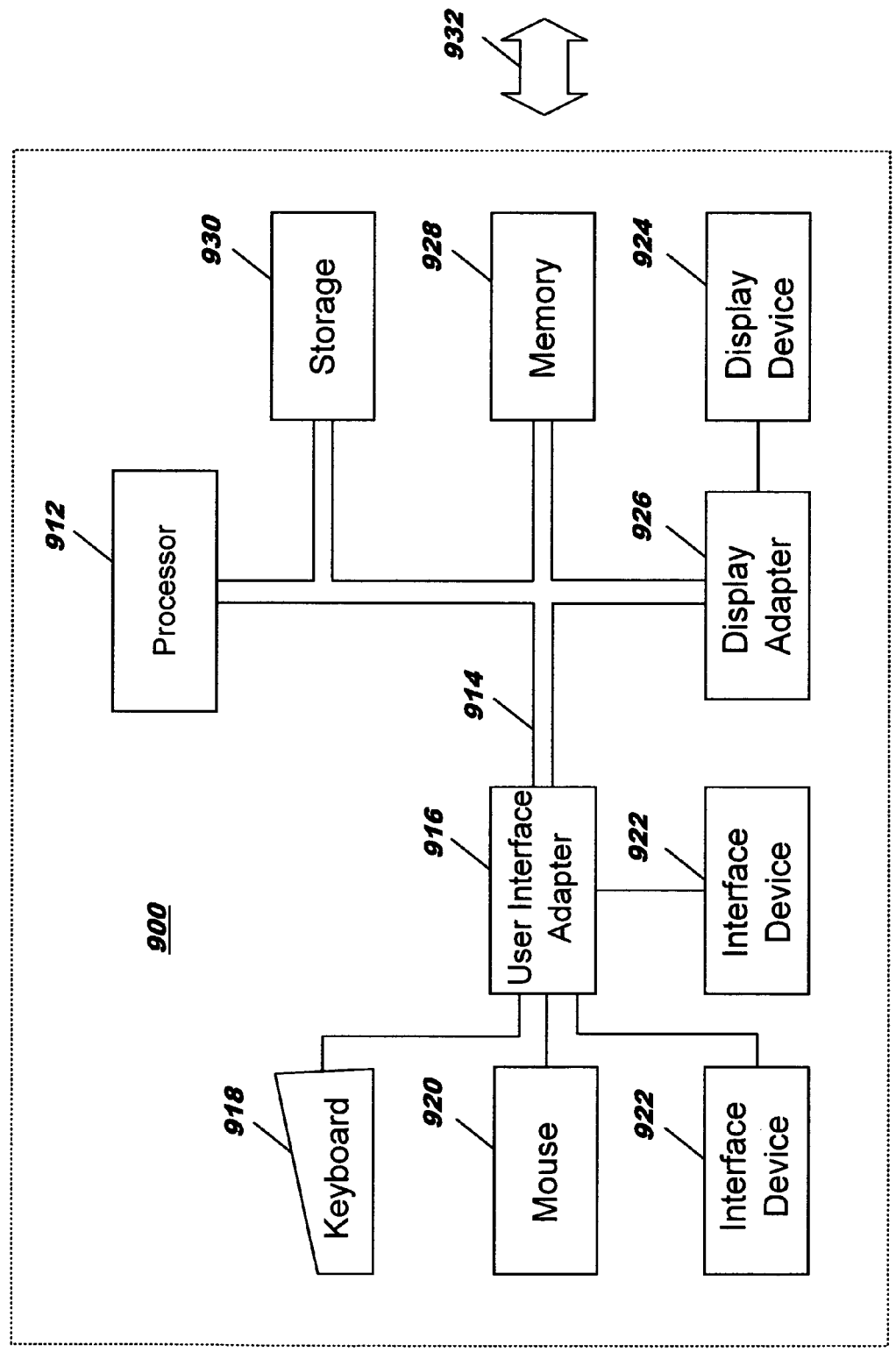
FIG. 9 depicts a data processing system suitable for storing and/or executing program code.

Referring now to FIG. 9, a data processing system 900 suitable for storing and/or executing program code includes at least one processor 912 coupled directly or indirectly to memory elements through a system bus 914. The memory elements can include local memory 928 employed during actual execution of the program code, bulk storage 930, and cache memories (not shown) which provide temporary storage of at least some program code in order to reduce the number of times code must be retrieved from bulk storage during execution.

Input/output (I/O") devices (including but not limited to keyboards 918, displays 924, pointing devices 920, other interface devices 922, etc.) can be coupled to the system either directly or through intervening I/O controllers or adapters (916, 926).

Network adapters may also be coupled to the system to enable the data processing system to become coupled to other data processing systems or remote printers or storage devices through intervening private or public networks (as shown generally at 932). Modems, cable modem attachments, wireless adapters, and Ethernet cards are just a few of the currently-available types of network adapters.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention. Furthermore, it should be understood that use of "a" or "an" in the claims is not intended to limit embodiments of the present invention to a singular one of any element thus introduced.

The invention claimed is:

1. A method of detecting wear through use of information-transmitting devices, comprising:
   providing at least one information-transmitting wireless device for each of one or more wear positions of an item, wherein each of the devices is adapted for transmitting information to a reader, such that each of the devices can transmit information usable for detecting wear of the item as the item wears; and
   providing at least one information-transmitting wireless device for each of one or more wear positions of a second item, wherein each of the devices provided for the second item is adapted for transmitting information to the reader, such that each of the devices provided for the second item can transmit information usable for detecting wear of the second item as the second item wears,
   wherein the information transmitted by the devices provided for the item and the information transmitted by the devices provided for the second item is usable for detecting whether the item and the second item are wearing in concert at an expected rate.

2. A method of detecting wear through use of information-transmitting devices, comprising:
   providing at least one information-transmitting wireless device for each of one or more wear positions of an item, wherein each of the devices is adapted for transmitting information to a reader, such that each of the devices can transmit information usable for detecting wear of the item as the item wears and wherein the transmitted information for each of the wear positions is usable for determining wear patterns of the item.

3. The method according to claim 2, wherein the transmitted information for each of the wear positions comprises a percentage of wear of the item at the wear position.

4. The method according to claim 2, wherein the transmitted information for each of the wear positions is also, or alternatively, usable for determining a rate of wear of the item.

5. The method according to claim 2, wherein a plurality of the devices are positioned such that wear is not detected if a first number of the plurality of the devices transmits the information to the reader, but is detected if at least one more than the first number of the devices transmits the information to the reader.

6. The method according to claim 2, further comprising the step of using the information transmitted to the reader, upon determining that the transmitted information indicates at least one abnormal wear pattern, to alter characteristics of the item.

7. The method according to claim 2, wherein:
   at least one of the devices provided for a particular wear position functions as a base tag; and
   at least one corresponding device is provided, for the device functioning as a base tag, wherein each of the at least one corresponding devices functions as a child tag of the base tag for the particular wear position.

8. A method of detecting wear through use of information-transmitting devices, comprising:
   providing at least one information-transmitting wireless device for each of one or more wear positions of an item, wherein each of the devices is adapted for transmitting information to a reader, such that each of the devices can transmit information usable for detecting wear of the item as the item wears, wherein:
   a plurality of devices is provided, for one or more selected ones of the wear positions, in a depth-wise, end-to-end arrangement; and
   at least one more-deeply-stacked one of the plurality of devices in the depth-wise, end-to-end arrangement corresponds to a decreased amount of remaining usable material of the item at the wear position.

* * * * *